(12) United States Patent  (10) Patent No.: US 7,715,617 B2
Nishio et al.  (45) Date of Patent: *May 11, 2010

(54) CIRCUIT AND METHOD FOR CORRECTION OF DEFECT PIXEL

(75) Inventors: Shigeru Nishio, Kawasaki (JP); Hiroshi Daiku, Kawasaki (JP); Asao Kokubo, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 285 days.

This patent is subject to a terminal disclaimer.

(21) Appl. No.: 11/892,842

(22) Filed: Aug. 28, 2007

(65) Prior Publication Data

US 2008/0252756 A1    Oct. 16, 2008

Related U.S. Application Data

(63) Continuation of application No. 10/626,539, filed on Jul. 25, 2003, now Pat. No. 7,263,215.

(30) Foreign Application Priority Data

Jul. 25, 2002   (JP)  ............................ 2002-216848
Oct. 30, 2002   (JP)  ............................ 2002-316077

(51) Int. Cl.
*G06K 9/00* (2006.01)
*H04N 9/64* (2006.01)

(52) U.S. Cl. .................. 382/149; 348/246; 348/294

(58) Field of Classification Search ................ 382/141, 382/143–150, 254, 274, 275, 300; 348/222.1, 348/246–247, 249–250, 275, 294
See application file for complete search history.

(56) References Cited

U.S. PATENT DOCUMENTS

| 6,222,935 | B1 | 4/2001 | Okamoto |
| 6,381,357 | B1* | 4/2002 | Tan et al. ..................... 382/141 |
| 6,504,572 | B2 | 1/2003 | Kramer et al. |
| 6,509,927 | B1* | 1/2003 | Prater et al. .............. 348/222.1 |
| 6,618,084 | B1 | 9/2003 | Rambaldi et al. |
| 6,665,009 | B1 | 12/2003 | Dong |
| 6,674,404 | B1 | 1/2004 | Lee et al. |
| 6,888,568 | B1 | 5/2005 | Neter |
| 7,009,644 | B1 | 3/2006 | Sanchez et al. |
| 7,034,873 | B2 | 4/2006 | Mendis et al. |
| 7,202,894 | B2* | 4/2007 | Kaplinsky et al. ........... 348/246 |

FOREIGN PATENT DOCUMENTS

| JP | 7-7675 | 1/1995 |
| JP | 2000-101924 | 4/2000 |
| JP | 2001307079 A | 11/2001 |

* cited by examiner

*Primary Examiner*—Kanji Patel
(74) *Attorney, Agent, or Firm*—Arent Fox LLP

(57) ABSTRACT

A semiconductor integrated circuit includes a check unit which compares a value of a pixel of interest with values of neighboring pixels contained in an image signal supplied from an image sensor, and determines based on the comparison whether the pixel of interest is defective, and a defect correcting unit which corrects the value of the pixel of interest by using values of surrounding pixels in response to the determination by the check unit that the pixel of interest is defective.

7 Claims, 8 Drawing Sheets

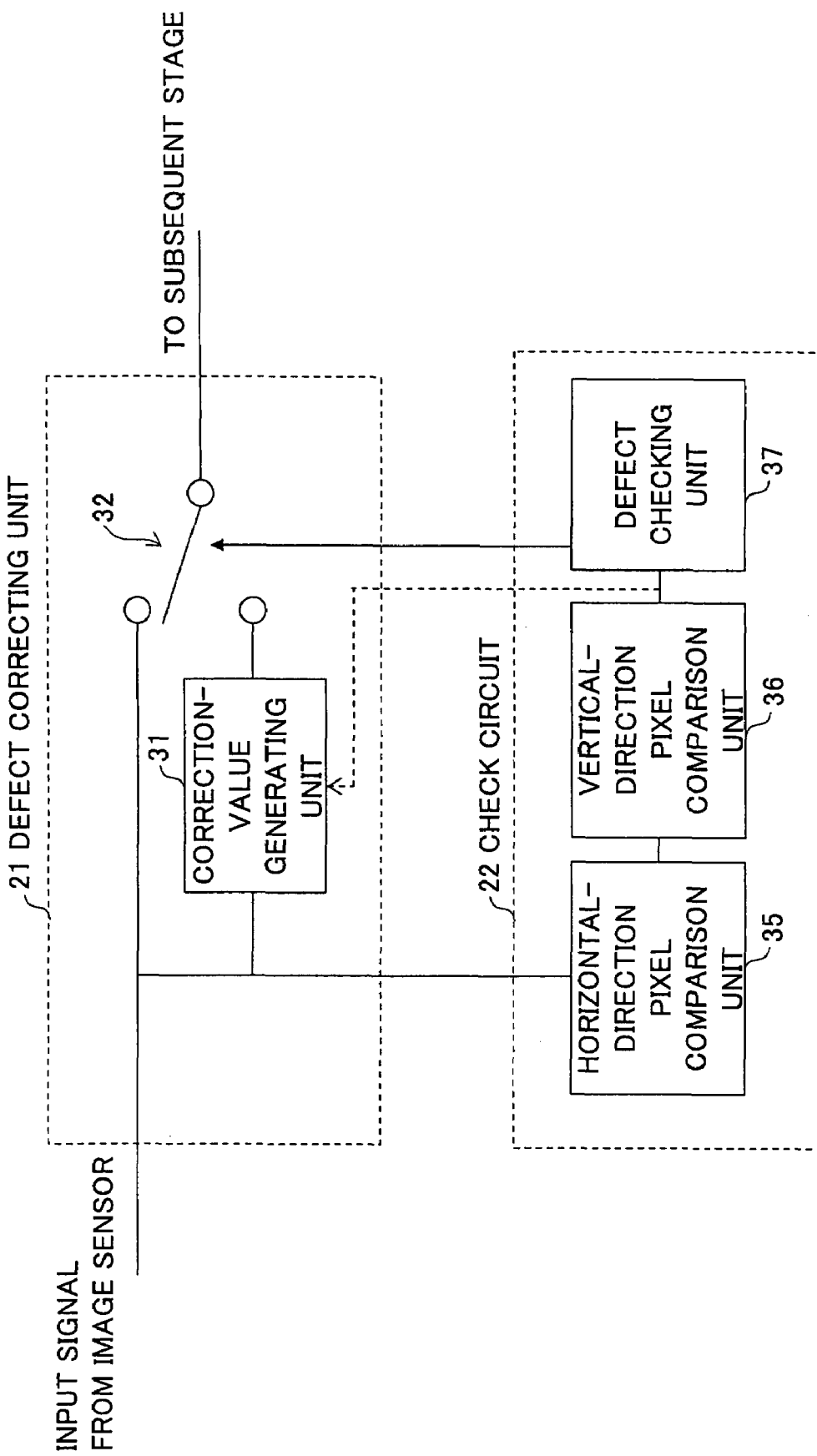

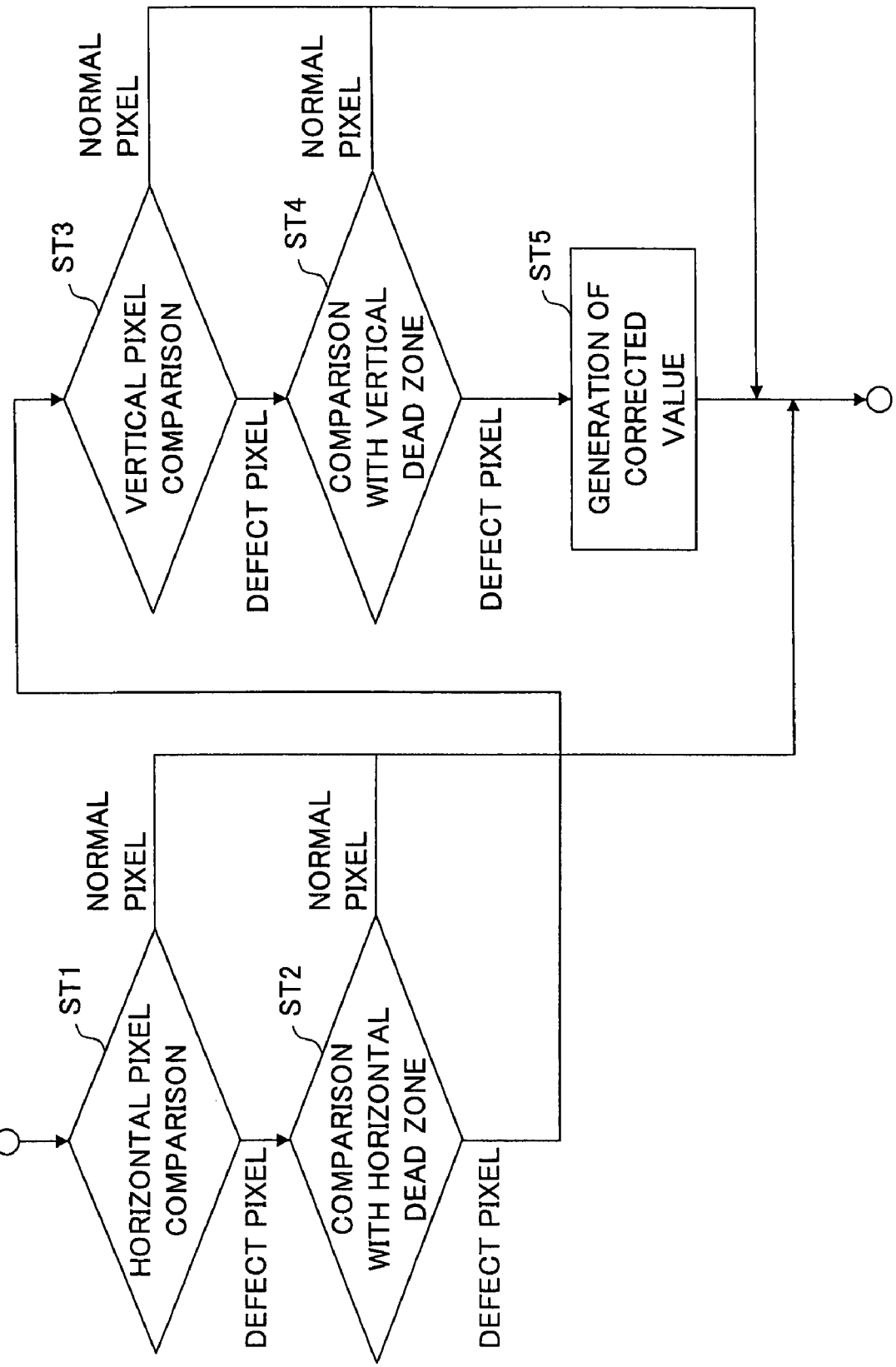

FIG.5A

|   | 0 | 1 | 2 | 3 |
|---|---|---|---|---|
| 0 | R | G | R | G |
| 1 | G | B | G | B |
| 2 | R | G | R | G |

FIG.5B

|  |  | p[x,y−2] |  |  |
|---|---|---|---|---|
|  |  |  |  |  |
| p[x−2,y] |  | p[x,y] |  | p[x+2,y] |
|  |  |  |  |  |
|  |  | p[x,y+2] |  |  |

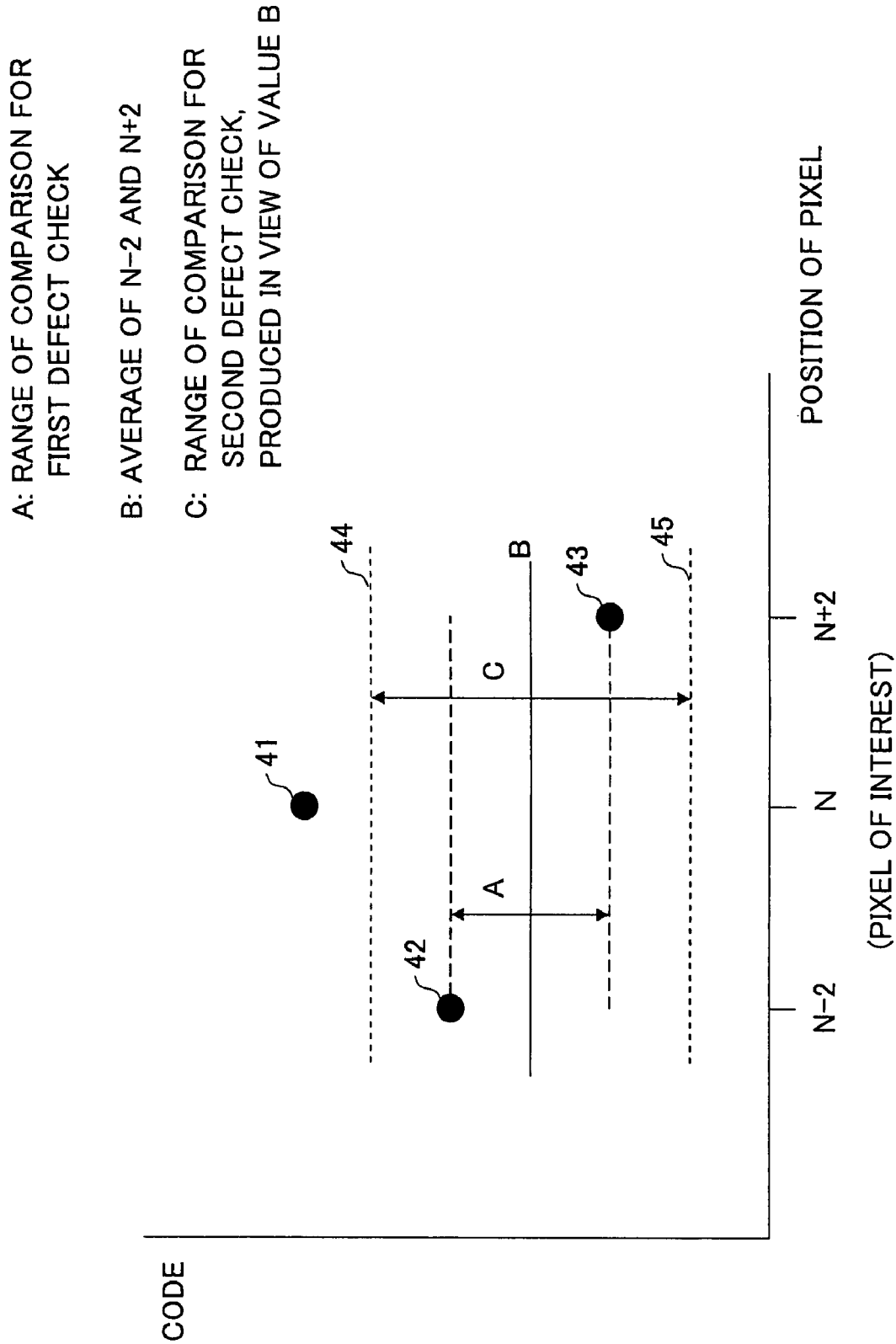

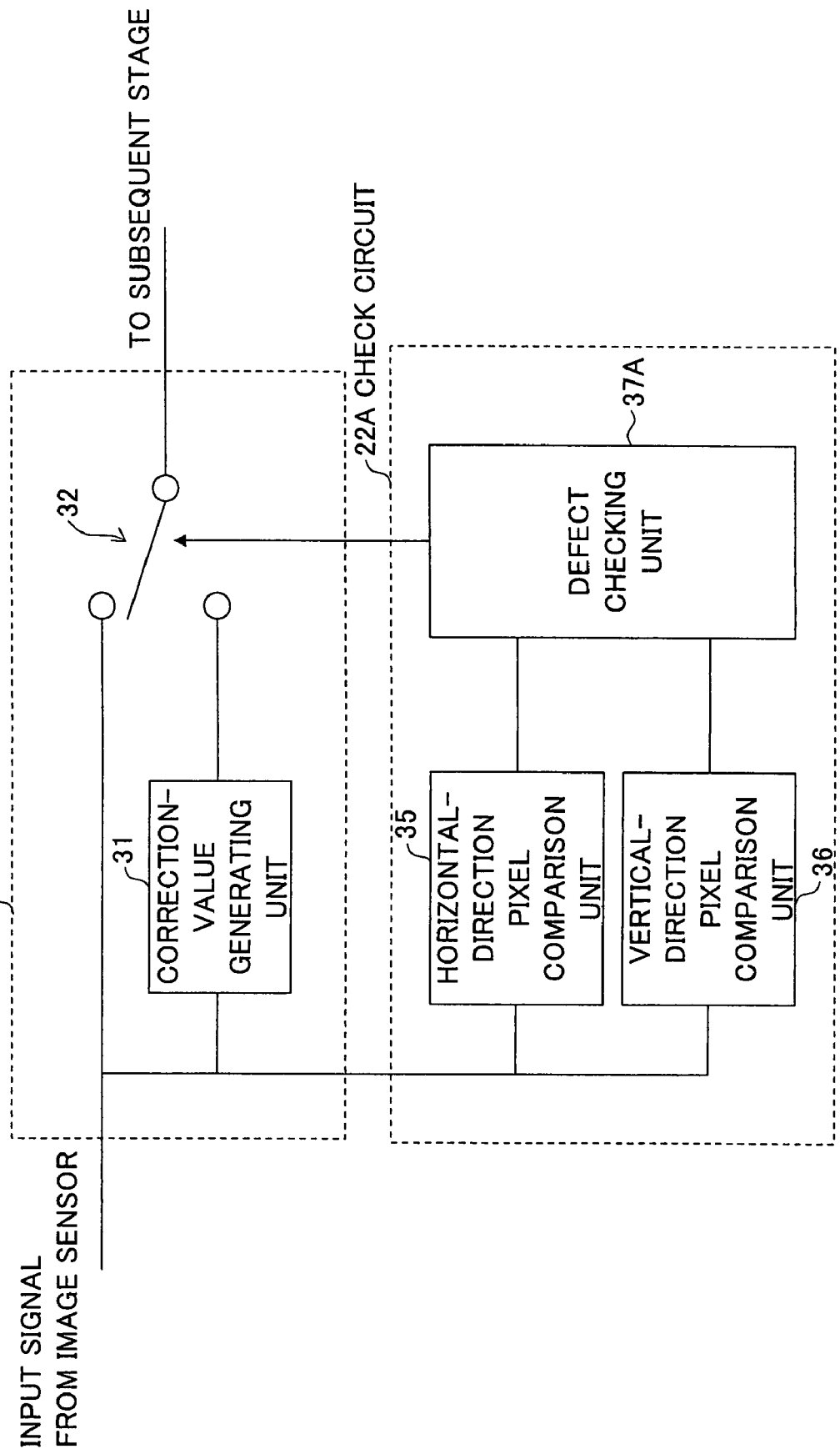

CIRCUIT AND METHOD FOR CORRECTION OF DEFECT PIXEL

CROSS-REFERENCE TO RELATED APPLICATIONS

This is a continuation application, which claims benefit of U.S. patent application Ser. No. 10/626,539, filed Jul. 25, 2003, now U.S. Pat. No. 7,263,215, which claims the benefit of priority from the prior Japanese Patent Application No. 2002-316077, filed on Oct. 30, 2002, with the Japanese Patent Office, the entire contents of which are incorporated herein by reference.

BACKGROUND OF THE INVENTION

1. Field of the Invention

The present invention generally relates to the processing of image signals supplied from a CMOS image sensor for image pickup, and particularly relates to the correction of defect pixels contained in the image signals from a CMOS image sensor.

2. Description of the Related Art

A CMOS image sensor includes a reception section in which a plurality of photo-diodes are arranged in a matrix array. These photo-diodes correspond to individual pixels for the imaging purpose. Incident light is subjected to photoelectric conversion on a pixel-by-pixel basis, and the electric charge obtained by the photoelectric conversion is accumulated in an electric charge storage section for reading of data. A large number of pixels inevitably include defective pixels that do not operate properly, which appear as fixed dark dots (black dots) or bright dots (white dots)

FIG. 1 is a block diagram showing the construction of a unit for defect correction of a CMOS image sensor.

The unit of FIG. 1 includes a defect correcting unit 11, a defect position storage device 12, and a RGB conversion unit 13. The defect correcting unit 11 receives image signals from an image sensor. The defect correcting unit 11 processes the data of defect pixels of the image signals for correction of defects, and supplies the corrected image signals to the RGB conversion unit 13. The RGB conversion unit 13 obtains color data of each pixel based on color information of the RGB Bayer array.

The unit for defect correction as shown in FIG. 1 is provided with the defect position storage device 12, which is a ROM (read only memory) for storing defect positions. The defect position storage device 12 has information recorded therein indicating the position of pixels that are ascertained as defective by the test conducted just prior to shipment. The defect correcting unit 11 identifies the position of defect pixels by referring to the position information recorded in the defect position storage device 12. Using information about surrounding pixels, the defect position storage device 12 performs interpolation so as to correct the data of each defect pixel.

In this manner, defect pixels appearing as dark (black) dots or bright (white) dots are interpolated by use of the surrounding pixels for blending into the surrounding image.

Japanese Patent Application Publication No. 2001-307079 discloses a method of correcting the electronic data of defect pixels with high accuracy. This method selects a pair of pixels having the smallest difference from the pairs of pixels surrounding a defect pixel, and interpolates a value of the defect pixel by use of an average of the two pixel values of the selected pixel pair.

Defects occur with certain probability (e.g., in accordance with the rate of defects generated during a wafer process). When a ROM is used as described above, correction may not be possible due to the limited storage size of the ROM if the number of defects exceeds the expected maximum number. Further, the ROM needs to store the information indicative of the position of pixels that are ascertained as defective by the test prior to shipment. If defects occur after the test as a result of deterioration with time, such defects cannot be corrected.

Accordingly, t here is a need for a defect correcting circuit which can cope with any number of defects, and can cope with such defects as occurring as a result of deterioration with time.

SUMMARY OF THE INVENTION

It is a general object of the present invention to provide a semiconductor integrated circuit that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a semiconductor integrated circuit particularly pointed out in the specification in such full, clear, concise, and exact terms as to enable a person having ordinary skill in the art to practice the invention.

To achieve these and other advantages in accordance with the purpose of the invention, the invention provides a semiconductor integrated circuit, including a check unit which compares a value of a pixel of interest with values of neighboring pixels contained in an image signal supplied from an image sensor, and determines based on the comparison whether the pixel of interest is defective, and a defect correcting unit which corrects the value of the pixel of interest by using values of surrounding pixels in response to the determination by the check unit that the pixel of interest is defective.

In the defect correction by the semiconductor integrated circuit described above, the value of the pixel of interest is compared with the values of neighboring pixels, thereby determining whether the value of the pixel of interest differs by more than a predetermined margin from the values of the neighboring pixels, i.e., determining whether the pixel of interest is sticking out from the neighboring pixels. According to the determination, the pixel of interest is ascertained to be a defect pixel if the pixel of interest is sticking out. In this case, the value of the pixel of interest is corrected according to the values of the surrounding pixels. Unlike the related-art configuration in which a defect position storage device such as a ROM is employed, the invention can cope with any numbers of defects without a particular limitation, and can also cope with such defects as occurring through deterioration with time.

According to another aspect of the present invention, a method of correcting a defect pixel in an image signal supplied from an image sensor includes the steps of comparing a value of a pixel of interest with values of neighboring pixels contained in the image signal supplied from the image sensor, determining, based on the comparison, whether the pixel of interest is defective, and correcting the value of the pixel of interest by using values of surrounding pixels in response to the determination that the pixel of interest is defective.

The method of correcting a defect pixel as described above can cope with any numbers of defects without a particular limitation, and can also cope with such defects as occurring through deterioration with time.

Other objects and further features of the present invention will be apparent from the following detailed description when read in conjunction with the accompanying drawings.

BRIEF DESCRIPTION OF THE DRAWINGS

FIG. 3 is a block diagram showing the construction of a defect correcting unit and a check circuit shown in FIG. 2;

FIG. 4 is a flowchart showing a method of correcting defect pixels that is performed by the construction shown in FIG. 3;

FIGS. 5A and 5B are illustrative drawings for explaining pixels subjected to comparison;

FIG. 6 is an illustrative drawing for explaining a comparison check with a dead zone;

FIG. 7 is a block diagram showing another configuration for defect correction of a CMOS image sensor according to the present invention.

DESCRIPTION OF THE PREFERRED EMBODIMENTS

In the following, embodiments of the present invention will be described with reference to the accompanying drawings.

Figure 1:
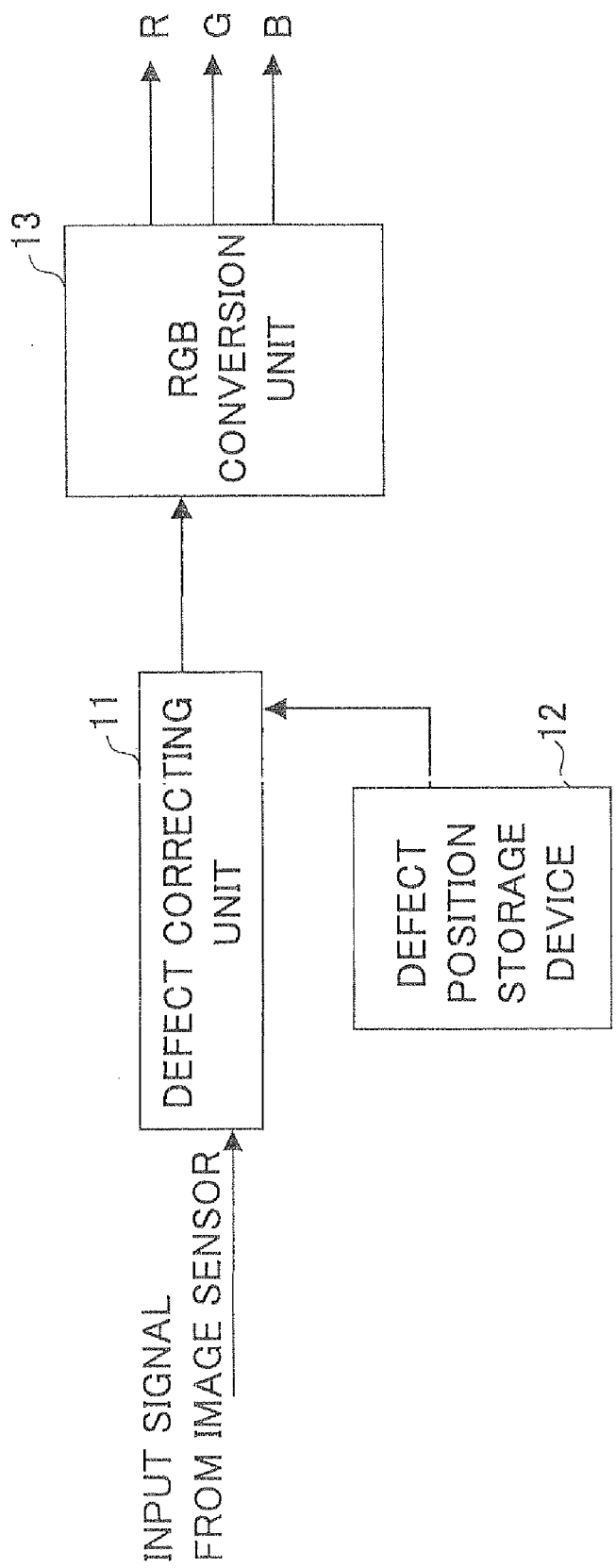
FIG. 1 is a block diagram showing the construction of a unit for defect correction of a CMOS image sensor.
Figure 2:
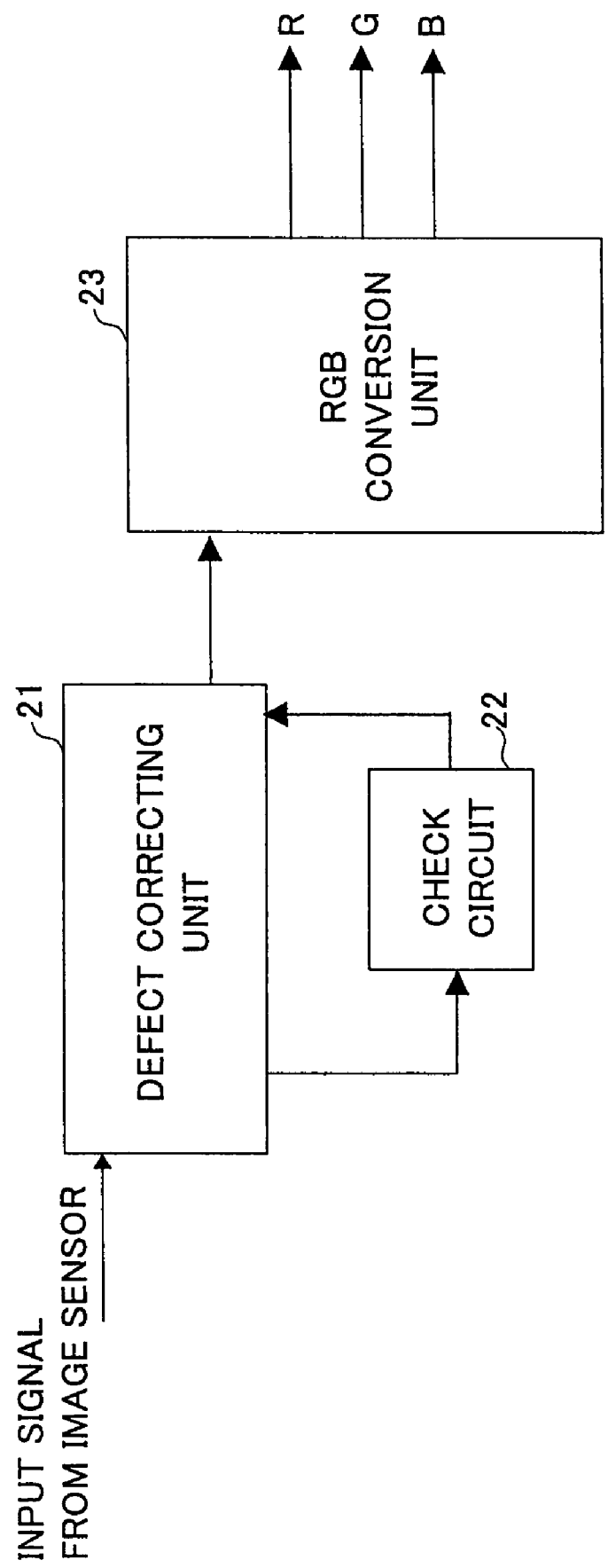
FIG. 2 is a block diagram showing the construction of a unit for defect correction of a CMOS image sensor according to the present invention.

FIG. 2 is a block diagram showing the construction of a unit for defect correction of a CMOS image sensor according to the present invention.

The unit of FIG. 2 includes a defect correcting unit 21, a check circuit 22, and a RGB conversion unit 23. The defect correcting unit 21 receives image signals from an image sensor. The defect correcting unit 21 processes the data of defect pixels of the image signals for correction of defects, and supplies the corrected image signals to the RGB conversion unit 23. The RGB conversion unit 23 obtains color data of each pixel based on color information of the RGB Bayer array.

In the construction shown in FIG. 2, the check circuit 22 checks, based on the data of a pixel of interest and surrounding pixels, whether the pixel of interest is a defect pixel. The defect correcting unit 21 identifies the position of a defect pixel based on the determination by the check circuit 22, and performs interpolation by using data of surrounding pixels so as to correct the data of the defect pixel.

In this manner, defect pixels appearing as dark (black) dots or bright (white) dots are interpolated by use of the surrounding pixels for blending into the surrounding image.

FIG. 3 is a block diagram showing the construction of the defect correcting unit 21 and the check circuit 22 shown in FIG. 2.

As shown in FIG. 3, the defect correcting unit 21 includes a corrected-value generating unit 31 and a switch unit 32. The check circuit 22 includes a horizontal-direction pixel comparison unit 35, a vertical-direction pixel comparison unit 36, and a defect checking unit 37.

FIG. 4 is a flowchart showing a method of correcting defect pixels that is performed by the construction shown in FIG. 3.

In the following, the correction of defect pixels according to the invention will be described with reference to FIG. 3 and FIG. 4.

At step ST1 of FIG. 4, pixel comparison is made in the horizontal direction. Specifically, data of each pixel is successively supplied from the image sensor to the defect correcting unit 21. The data of each pixel is in turn supplied from the defect correcting unit 21 to the horizontal-direction pixel comparison unit 35 of the check circuit 22, by which pixel comparison is made in the horizontal direction.

FIGS. 5A and 5B are illustrative drawings for explaining pixels subjected to comparison. FIG. 5A shows a RGB Bayer array. In the typical output of an image sensor, each pixel does not have the data indicative of three R, G, and B colors. Rather, each pixel represents one pre-assigned color among the RGB colors as shown in FIG. 5A. The RGB array shown in FIG. 5A is commonly referred to as the RGB Bayer array. Based on the RGB Bayer array, the RGB conversion unit 23 performs a process for assigning the three RGB colors to each pixel.

FIG. 5B is an illustrative drawing showing the positional relationship between neighboring pixels having the same color in the RGB Bayer array. As can be seen from FIG. 5A, pixels having the same color in the RGB Bayer array are located at every other pixel position in the vertical direction as well as in the horizontal direction. When a particular color (e.g., R) is considered, with a pixel of interest p[x, y] noted as having this color, the four neighboring pixels having the same color are p[x, y−2], p[x−2, y], p[x+2, y], and p[x, y+2].

At step ST1 of FIG. 4, it is p[x−2, y] and p[x+2, y] that are subjected to horizontal pixel comparison in respect of the pixel of interest p[x, y]. Specifically, a check is made as to whether the following condition is satisfied.

$$(p[x-2, y] \leq p[x, y] \leq p[x+2, y]) \text{ or }$$
$$(p[x-2, y] \geq p[x, y] \geq p[x+2, y]) \quad (1)$$

If the condition (1) is satisfied, the pixel of interest is ascertained to be a normal pixel. In such a case, the procedure comes to an end without performing a correction process in the flowchart of FIG. 4. Accordingly, the value of the pixel of interest stays the same as originally provided in the input signals.

The operation described above will now be fit into the construction shown in FIG. 3. If the horizontal-direction pixel comparison unit 35 finds the pixel of interest to be a normal pixel, the vertical-direction pixel comparison unit 36 and the defect checking unit 37 do not operate, for example. As a result, the switch unit 32 selects the input image signals from the image sensor as a default selection, and passes the selected signals to the output.

If the condition (1) is not satisfied, at step ST2 of FIG. 4, a comparison is made with the dead zone in the horizontal direction. Specifically, the horizontal-direction pixel comparison unit 35 of the check circuit 22 performs a comparison check based on the data of each supplied pixel as shown in the following.

$$p[x, y] < W\text{limit} \times (p[x-2, y] + p[x+2, y])/2 + W\text{offset} \quad (2)$$

$$p[x, y] > B\text{limit} \times (p[x-2, y] + p[x+2, y])/2 - B\text{offset} \quad (3)$$

Here, Wlimit and Woffset are constants that define the upper limit of the dead zone. For example, Wlimit may be around 1.2, and Woffset may be around 20 to 30 in the gray scale of 256 levels. Blimit and Boffset are constants that define the lower limit of the dead zone. For example, Blimit may be around 0.8, and Boffset may be around 20 to 30 in the gray scale of 256 levels. Wlimit and Blimit may be the same value, or may be set to different values. Woffset and Boffset may be the same value, or may be set to different values.

FIG. 6 is an illustrative drawing for explaining the comparison check with the dead zone.

In FIG. 6, the horizontal axis represents the position N of the pixel of interest and positions N−2 and N+2 of the neighboring pixels. The vertical axis represents the pixel value (i.e., pixel code) of each pixel. In this example, the pixel of interest 41 has the largest pixel value, and the neighboring pixels 42 and 43 have pixel values as shown in FIG. 6. A range A is defined by the pixel value of the neighboring pixel 42 and the pixel value of the neighboring pixel 43. If the pixel value 41 falls within this range A, the condition (1) corresponding to the check of step ST1 is satisfied. A range C is defined by a dead-zone upper limit 44 (the value of the right-hand side of the inequality (2)) and a dead-zone lower limit 45 (the value of the right-hand side of the inequality (3)), which are obtained based on an average B of the pixel values of the neighboring pixels 42 and 43. If the pixel of interest 41 falls within the range C, the inequalities (2) and (3) corresponding to the check of step ST2 are satisfied.

If both of the inequalities (2) and (3) are satisfied, the pixel of interest is ascertained to be a normal pixel. In such a case, the procedure comes to an end without performing a correction process in the flowchart of FIG. 4. Accordingly, the value of the pixel of interest stays the same as originally provided in the input signals.

This operation will now be fit into the construction of FIG. 3. If the horizontal-direction pixel comparison unit 35 finds the pixel of interest to be a normal pixel, the vertical-direction pixel comparison unit 36 and the defect checking unit 37 do not operate, for example. As a result, the switch unit 32 selects the input image signals from the image sensor as a default selection, and passes the selected signals to the output.

If the conditions (2) and (3) are not satisfied, at step ST3 of FIG. 4, pixel comparison is made in the vertical direction. Specifically, when data of each pixel is successively supplied from the image sensor to the defect correcting unit 21 in the construction of FIG. 3, the data of each pixel is in turn supplied from the defect correcting unit 21 to the vertical-direction pixel comparison unit 36 via the horizontal-direction pixel comparison unit 35. The vertical-direction pixel comparison unit 36 performs pixel comparison in the vertical direction.

Pixel values subjected to the vertical pixel comparison are p[x, y−2] and p[x, y+2]. Specifically, a check is made as to whether the following condition is satisfied.

$$(p[x, y-2] \leq p[x, y] \leq p[x, y+2]) \text{ or } (p[x, y-2] \geq p[x, y] \geq p[x, y+2]) \quad (4)$$

If the condition (4) is satisfied, the pixel of interest is ascertained to be a normal pixel. In such a case, the procedure comes to an end without performing a correction process in the flowchart of FIG. 4. Accordingly, the value of the pixel of interest stays the same as originally provided in the input signals.

The operation described above will now be fit into the construction shown in FIG. 3. If the vertical-direction pixel comparison unit 36 finds the pixel of interest to be a normal pixel, the defect checking unit 37 does not operate, for example. As a result, the switch unit 32 selects the input image signals from the image sensor as a default selection, and passes the selected signals to the output.

If the condition (4) is not satisfied, at step ST4 of FIG. 4, a comparison is made with the dead zone in the vertical direction. Specifically, the vertical-direction pixel comparison unit 36 of the check circuit 22 performs a comparison check based on the data of each supplied pixel as shown in the following.

$$p[x, y] < W\text{limit} \times (p[x, y-2] + p[x, y+2])/2 + W\text{offset} \quad (5)$$

$$p[x, y] > B\text{limit} \times (p[x, y-2] + p[x, y+2])/2 - B\text{offset} \quad (6)$$

Here, Wlimit and Woffset are constants that define the upper limit of the dead zone. For example, Wlimit may be around 1.2, and Woffset may be around 20 to 30 in the gray scale of 256 levels. Blimit and Boffset are constants that define the lower limit of the dead zone. For example, Blimit may be around 0.8, and Boffset may be around 20 to 30 in the gray scale of 256 levels. Wlimit and Blimit may be the same value, or may be set to different values. Woffset and Boffset may be the same value, or may be set to different values.

If both of the inequalities (5) and (6) are satisfied, the pixel of interest is ascertained to be a normal pixel. In such a case, the procedure comes to an end without performing a correction process in the flowchart of FIG. 4. Accordingly, the value of the pixel of interest stays the same as originally provided in the input signals.

This operation will now be fit into the construction of FIG. 3. If vertical-direction pixel comparison unit 36 finds the pixel of interest to be a normal pixel, the defect checking unit 37 does not operate, for example. As a result, the switch unit 32 selects the input image signals from the image sensor as a default selection, and passes the selected signals to the output.

If either the condition (5) or the condition (6) is not satisfied, a corrected value is generated at step ST5 of FIG. 4, and the correction process is performed on the pixel of interest. Specifically, the corrected-value generating unit 31 of the defect correcting unit 21 carries out a process as follows, thereby obtaining a corrected value in respect of the pixel of interest that is defective. If the condition (5) is not specified, the pixel of interest is ascertained to be a bright (white) defect pixel, followed by this computation.

$$p[x, y] = p[x, y] \times W\text{weight} + (p[x-2, y] + p[x+2, y] + p[x, y-2] + p[x, y+2])/4 \times (1 - W\text{weight}) \quad (7)$$

If the condition (6) is not specified, the pixel of interest is ascertained to be a dark (black) defect pixel, followed by this computation.

$$p[x, y] = p[x, y] \times B\text{weight} + (p[x-2, y] + p[x+2, y] + p[x, y-2] + p[x, y+2])/4 \times (1 - B\text{weight}) \quad (8)$$

Here, Wweight and Bweightb are factors for adjusting relative weight of the pixel of interest and the four surrounding pixels when the pixel of interest is corrected. When these factors are close to 1, the original value of the pixel of interest is relatively respected in obtaining the corrected value. When these factors are close to 0, the original value of the pixel of interest is relatively ignored, and the values of the surrounding pixels are mainly used in obtaining the corrected value. Wweight and Bweight may be the same value, or may be set to different values.

If Wweight and Bweight are set to the same value, the equations (7) and (8) become identical, so that the corrected-value generating unit 31 may perform the same process for generating a corrected value regardless of the determination of conditions. If Wweight and Bweight are set to different values, the corrected-value generating unit 31 performs different processes for generating a corrected value, depending on which one of the equations (7) and (8) is not satisfied. In this case, provision is made such that the corrected-value generating unit 31 can refer to the check determination made by the vertical-direction pixel comparison unit 36, as indicated by dotted lines in FIG. 3.

In FIG. 3, the corrected-value generating unit 31 generates a corrected value, and, at the same time, the vertical-direction pixel comparison unit 36 supplies a signal to the defect checking unit 37 for indicating that one of the equations (5) and (6) is not satisfied. In response to this signal, the defect checking unit 37 ascertains that the pixel of interest is defective, thereby setting the switch unit 32 to select the output of the corrected-value generating unit 31. As a result, the corrected value generated by the corrected-value generating unit 31 is supplied to a next processing stage with respect to the pixel of interest.

In this manner, the defect correction according to the invention compares the value of the pixel of interest with the values of surrounding pixels in both the horizontal direction and the vertical direction, thereby determining whether the value of the pixel of interest differs by more than a predetermined margin from the values of the surrounding pixels, i.e., determining whether the pixel of interest is sticking out from the surrounding pixels. According to the determination, the pixel of interest is ascertained to be a defect pixel if the pixel of interest is sticking out. In this case, the value of the pixel of interest is corrected according to the values of the surrounding pixels. Unlike the related-art configuration in which a defect position storage device such as a ROM is employed, the invention can cope with any number of defects without a particular limitation, and can also cope with such defects as occurring through deterioration with time.

In the defect correction of the invention, the horizontal check and the vertical check are independently performed, and the pixel of interest is ascertained to be defective only if both of the checks determine that the pixel of interest is a defect pixel. Even if a prominent vertical or horizontal line is present with pixel values differing significantly from surrounding pixel values, either the horizontal check or the vertical check produces a determination indicative of the case of normal pixels, resulting in no correction of pixel values. In this manner, the invention can ascertain that prominent horizontal or vertical lines are normal image data, thereby avoiding erroneously erasing these lines.

FIG. 7 is a block diagram showing another configuration for defect correction of a CMOS image sensor according to the present invention. In FIG. 7, the same elements as those of FIG. 3 are referred to by the same numerals, and a description thereof will be omitted unless it is necessary.

In the configuration of FIG. 7, horizontal pixel comparison by the horizontal-direction pixel comparison unit 35 and vertical pixel comparison by the vertical-direction pixel comparison unit 36 are performed in parallel. Namely, the data of each pixel that is successively supplied from the image sensor to the defect correcting unit 21 is in turn supplied to the horizontal-direction pixel comparison unit 35 as well as to the vertical-direction pixel comparison unit 36 in the check circuit 22A. The horizontal-direction pixel comparison unit 35 and the vertical-direction pixel comparison unit 36 performs respective check operations simultaneously, and supply respective determinations to the defect checking unit 37A. The defect checking unit 37A ascertains the pixel of interest to be defective if both the horizontal-direction pixel comparison unit 35 and the vertical-direction pixel comparison unit 36 ascertain that the pixel of interest is a defect pixel. In such a case, the defect checking unit 37A sets the switch unit 32 to select the output of the corrected-value generating unit 31.

The configuration as described above produces the same defect determination as does the configuration of FIG. 3.

In the configuration of FIG. 7, the horizontal-direction pixel comparison unit 35 and the vertical-direction pixel comparison unit 36 make respective comparisons concurrently. Alternatively, comparison by the horizontal-direction pixel comparison unit 35 may be made after the vertical-direction pixel comparison unit 36 makes a comparison. Namely, the horizontal-direction pixel comparison unit 35 and the vertical-direction pixel comparison unit 36 may exchange positions in he configuration of FIG. 3, thereby reversing the order in which horizontal comparison and vertical comparison are made. Such configuration produces the same defect determination as does the configuration of FIG. 3.

Figure 8:
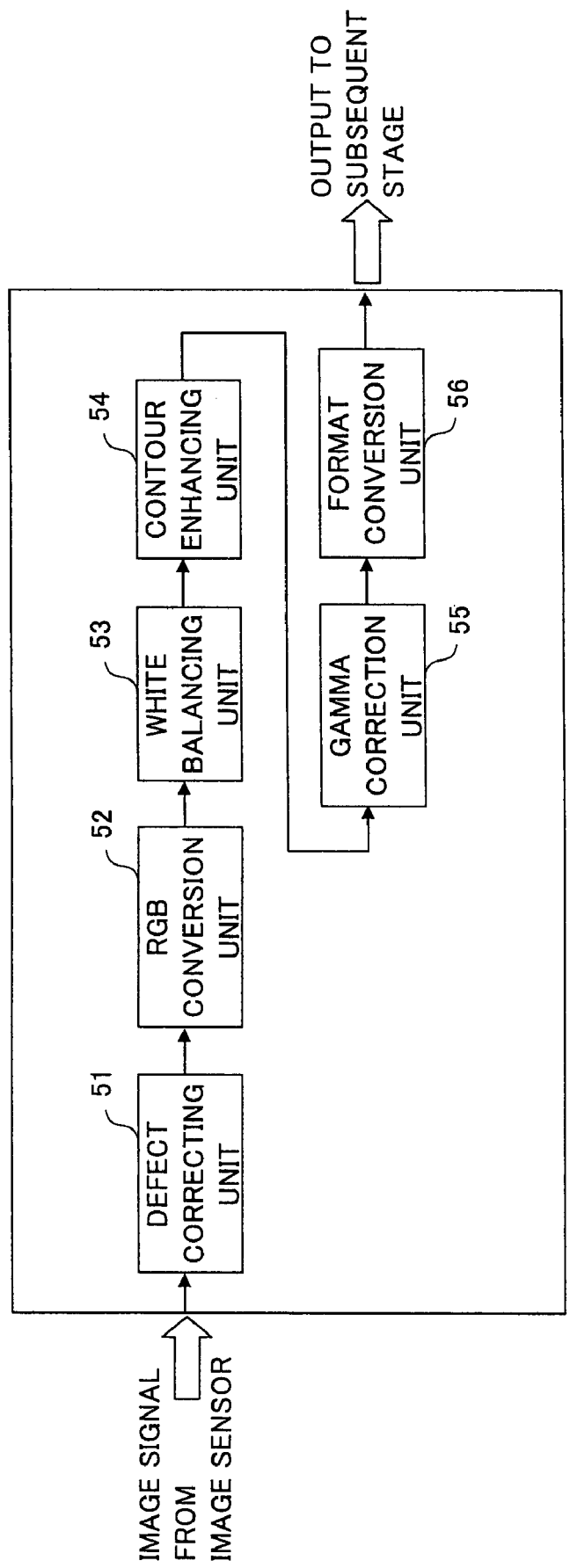
FIG. 8 is a block diagram showing the construction of an image processor to which defect correction of the invention is applied.

FIG. 8 is a block diagram showing the construction of an image processor to which defect correction of the invention is applied.

The image processor of FIG. 8 includes a defect correcting unit 51, a RGB conversion unit 52, a white balancing unit 53, a contour enhancing unit 54, a gamma correction unit 55, and a format conversion unit 56.

The defect correcting unit 51 receives image signals from an image sensor such as a CCD (charge coupled device), and carries out defect correction of the invention. The image signals having undergone the defective pixel correction are supplied from the defect correcting unit 51 to the RGB conversion unit 52. The RGB conversion unit 52 outputs image signals by obtaining color data of each pixel based on color information of the RGB Bayer array. The image signals output from the RGB conversion unit 52 are then subjected to white balancing by the white balancing unit 53. After this, the contour enhancing unit 54 carries out a process for enhancing contours. The gamma correction unit 55 applies a process for correcting gamma characteristics of the output apparatus. Finally, the format conversion unit 56 converts the image signals into a format acceptable to a subsequent processing stage, and the converted image signals are output.

Further, the present invention is not limited to these embodiments, but various variations and modifications may be made without departing from the scope of the present invention.

What is claimed is:

1. A semiconductor integrated circuit, comprising:
a check unit which compares a value of a pixel of interest with values of neighboring pixels contained in an image signal supplied from an image sensor, and determines based on the comparison whether the pixel of interest is defective; and
a defect correcting unit which corrects the value of the pixel of interest by using values of surrounding pixels in response to the determination by said check unit that the pixel of interest is defective,
wherein said defect correcting circuit includes:
a corrected-value generating unit which generates a corrected value by correcting the value of the pixel of interest based on an average of the values of the surrounding pixels;
and a switch unit which selects either the corrected value or the image signal from the image sensor in response to the determination by said check unit.

2. The semiconductor integrated circuit as claimed in claim 1, wherein said check unit ascertains that the pixel of interest is defective in response to a detection that the value of the pixel of interest differs from the values of the neighboring pixels by more than a predetermined value.

3. A semiconductor integrated circuit, comprising:
a check unit which compares a value of a pixel of interest with values of neighboring pixels contained in an image signal supplied from an image sensor, and determines based on the comparison whether the pixel of interest is defective; and a defect correcting unit which corrects the value of the pixel of interest by using values of surrounding pixels in response to the determination by said check unit that the pixel of interest is defective, wherein said check unit ascertains that the pixel of interest is defective in response to a detection that the value of the pixel of interest differs from the values of the neighboring pixels by more than a predetermined value, and wherein said check unit includes:

a first comparison unit which determines whether the value of the pixel of interest differs from the values of the neighboring pixels by more than a first predetermined difference in a first pixel-array direction;

a second comparison unit which determines whether the value of the pixel of interest differs from the values of the neighboring pixels by more than a second predetermined difference in a second pixel-array direction;

a defect checking unit which ascertains that the pixel of interest is defective if both said first comparison unit and said second comparison unit determine that the value of the pixel of interest differs from the values of the neighboring pixels by more than the respective predetermined differences.

4. The semiconductor integrated circuit as claimed in claim 3, wherein said first comparison unit determines whether the value of the pixel of interest differs from an average of the values of the neighboring pixels by more than the first predetermined difference in the first pixel-array direction, and said second comparison unit determines whether the value of the pixel of interest differs from an average the values of the neighboring pixels by more than the second predetermined difference in the second pixel-array direction.

5. A method of correcting a defect pixel in an image signal supplied from an image sensor, comprising the steps of:

comparing a value of a pixel of interest with values of neighboring pixels contained in the image signal supplied from the image sensor;

determining, based on the comparison, whether the pixel of interest is defective; and correcting the value of the pixel of interest by using values of surrounding pixels in response to the determination that the pixel of interest is defective, wherein said step of determining ascertains that the pixel of interest is defective in response to a detection that the value of the pixel of interest differs from the values of the neighboring pixels by more than a predetermined value, and wherein said step of determining includes:

a first comparison step of determining whether the value of the pixel of interest differs from the values of the neighboring pixels by more than a first predetermined difference in a first pixel-array direction;

a second comparison step of determining whether the value of the pixel of interest differs from the values of the neighboring pixels by more than a second predetermined difference in a second pixel-array direction;

a step of ascertaining that the pixel of interest is defective if both said first comparison step and said second comparison step determine that the value of the pixel of interest differs from the values of the neighboring pixels by more than the respective predetermined differences.

6. An image processor, comprising:

a check unit which compares a value of a pixel of interest with values of neighboring pixels contained in an image signal supplied from an image sensor, and determines based on the comparison whether the pixel of interest is defective;

a defect correcting unit which corrects the value of the pixel of interest by using values of surrounding pixels in response to the determination by said check unit that the pixel of interest is defective; and a processing unit which processes the image signal having undergone defect correction by the defect correcting unit, wherein said defect correcting circuit includes:

a corrected-value generating unit which generates a corrected value by correcting the value of the pixel of interest based on an average of the values of the surrounding pixels;

and a switch unit which selects either the corrected value or the image signal from the image sensor in response to the determination by said check unit.

7. The image processor as claimed in claim 6, the processing unit includes at least one of a RGB conversion unit, a white balancing unit, a contour enhancing unit, a gamma correction unit, and a format conversion unit.

* * * * *